US009830445B1

(12) United States Patent
Machani (10) Patent No.: US 9,830,445 B1
(45) Date of Patent: Nov. 28, 2017

(54) PERSONAL IDENTIFICATION NUMBER (PIN) REPLACEMENT IN A ONE-TIME PASSCODE BASED TWO FACTOR AUTHENTICATION SYSTEM

(71) Applicant: EMC Corporation, Hopkinton, MA (US)

(72) Inventor: Salah Machani, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 133 days.

(21) Appl. No.: 14/973,950

(22) Filed: Dec. 18, 2015

(51) Int. Cl.
*G06F 7/04* (2006.01)
*H04L 9/32* (2006.01)
*G06F 21/00* (2013.01)
*G06F 21/40* (2013.01)
*G06F 21/32* (2013.01)

(52) U.S. Cl.
CPC .............. *G06F 21/40* (2013.01); *G06F 21/32* (2013.01)

(58) Field of Classification Search
CPC ................................. G06F 21/40; G06F 21/32
USPC ....... 726/18, 5, 6, 9; 713/168, 172, 184–186
See application file for complete search history.

(56) References Cited

U.S. PATENT DOCUMENTS

| 6,526,161 | B1 | 2/2003 | Yan | |
| 6,535,978 | B1 | 3/2003 | Padgett et al. | |
| 8,087,074 | B2 | 12/2011 | Popp et al. | |
| 8,868,923 | B1 * | 10/2014 | Hamlet | G06F 21/00 326/8 |
| 2008/0028447 | A1 * | 1/2008 | O'Malley | G06F 21/31 726/6 |

* cited by examiner

*Primary Examiner* — Aravind Moorthy
(74) *Attorney, Agent, or Firm* — BainwoodHuang (57) ABSTRACT

Biometric information is used to generate a one-time passcode in a two factor authentication process. A current biometric sample is obtained from a user requesting access to a secure resource, together with a user identifier and a current token code. A bio-hash value that encodes a distinct biometric identifier of the authentic user for the user identifier, combined with the authentic user's PIN, is retrieved. A computed PIN is generated based on biometric information extracted from the current biometric sample and the bio-hash value. The computed PIN is combined with the current token code to generate a one-time passcode. The one-time passcode and the user identifier are conveyed to an external user identity verification process that uses the one-time passcode to validate the computed PIN and current token code contained in the one-time passcode.

19 Claims, 4 Drawing Sheets

PERSONAL IDENTIFICATION NUMBER (PIN) REPLACEMENT IN A ONE-TIME PASSCODE BASED TWO FACTOR AUTHENTICATION SYSTEM

BACKGROUND

Two-factor authentication provides user identification based on the combination of two different components: i) something that the user possesses, and ii) something that the user knows. For example, a hardware or software based security token may be assigned to a user, and generate a "token code" at fixed intervals using a built-in clock and a factory-encoded random key known as the "seed". The seed is different for each token, and is loaded into a corresponding server when the token is purchased. In order to authenticate to a secure network resource at a client system, the user must enter their username, and both the token code being displayed by the token at that moment, and a secret personal identification number (PIN). The token code and PIN entered by the user are combined to form a one-time passcode that is transmitted together with the username from the client to the server. The server authenticates the user based on the data received from the client, by computing the token code that the token is supposed to be showing at that moment in time using the server's copy of the unique seed assigned to the user's token, and comparing the computed token code value to the token code value contained in the one-time passcode received from the client system.

SUMMARY

Previous approaches to generating one-time passcodes in two factor authentication systems have been problematic with regard to the requirement that the user enter their PIN each time they use the system to generate a one-time passcode. Specifically, requiring that the user enter their PIN each time a one-time passcode is needed for authentication is time consuming, and inconvenient to the user. Moreover, typing a PIN can be an error-prone user action, especially on relatively small end user devices that have small password entry interfaces. However, user PINs remain an important factor in performing user authentication, and generating one-time passcodes with user PINs is necessary to accommodate the needs of many authentication systems.

To address the above and other problems associated with previous systems that generate one-time passcodes using two factor authentication, an approach is disclosed herein for using biometric information to generate a one-time passcode in a two factor authentication process. In the disclosed system, during an authentication operation, a biometric sample is captured from a user of a user device through which access is being requested to a secure resource. A user identity and a current token code are also input. The current token code may be entered manually by the user, or automatically input from a software security token. Biometric information is extracted from the biometric sample. A bio-hash value associated with the user identity is automatically retrieved using the user identity. The bio-hash value associated with the user identity is a combination of biometric information that uniquely identifies the authentic user for the user identity, and the authentic user's PIN. PIN computation is performed using the biometric information extracted from the captured biometric sample and the bio-hash value associated with the user identity. The output of the PIN computation is a computed PIN. The PIN computation is performed such that the computed PIN matches the authentic user's PIN when the biometric information extracted from the captured biometric sample matches the biometric information that was combined with the authentic user's PIN to generate the bio-hash value associated with the user identity. The computed PIN is then combined with the current token code to generate a one-time passcode. The one-time passcode generated from the computed PIN and the current token code is then output, so that is provided to a user identity verification process for validation. For example, the generated one-time passcode and the user identity may be automatically sent from the user device to a user identity verification process executing on a remote server. Alternatively, the one-time passcode generated from the computer PIN and the current token code may be displayed to the user through a display on the user's device, for the user to read. The user may then manually enter the one-time passcode, together with the user identity, into a user interface of the user identity verification process. The user identity verification process uses the one-time passcode to determine whether the user of the device is the authentic user for the user identity. If the identity verification process verifies that the user of the device is the authentic user for the user identity, access is granted to the secure resource through the user device.

In another aspect of the disclosed system, during a PIN replacement operation prior to the authentication operation, the disclosed system inputs the user identity, a manually entered PIN, and an initial token code. For example, the initial token code may be a token code generated and/or displayed by a hardware or software security token assigned to the authentic user for the user identity, at the time of the PIN replacement operation. The initial token code may either be manually entered by the user to the user device, or automatically input from a software security token. An initial biometric sample is also captured from the authentic user for the user identity at the time of the PIN replacement operation. The manually entered PIN and the initial token code are combined to generate an initial one-time passcode. The initial one-time passcode and the user identity are automatically sent to the user identity verification process, or manually entered into a user interface of the user identity verification process. The user identity verification process verifies that the user of the device is the authentic user for the user identity. In response to the verification process verifying that the user of the device is the authentic user for the user identity, initial biometric information is extracted from the initial biometric sample and combined with the manually entered PIN by a bio-hash value generation function. The output of the bio-hash value generation function is the bio-hash value that is associated with the user identity. The bio-hash value combines the biometric information that uniquely identifies the authentic user for the user identity and the manually entered PIN, which is the authentic user's PIN. The bio-hash value is stored in association with the user identity on the user device, so that it can subsequently be retrieved based on the user identity. After completion of the PIN replacement operation, the authentic user for the user identity can gain access to the secure resource by providing their user identity, a current token code, and a biometric sample, and does not need to remember or enter their PIN.

Embodiments of the disclosed system may provide significant advantages over previous approaches. Specifically, instead of having to enter their PIN, after completion of the PIN replacement operation, a user can provide a biometric sample to gain access to a secure resource. The user is accordingly not required to remember or enter their PIN after completion of the PIN replacement operation. The resulting ease of use provides improved convenience to the user. In addition, since typing or otherwise entering a PIN is an error-prone action, PIN entry errors and related problems may be significantly reduced. And since the disclosed system generates one-time passcodes that include a computed copy of the user's PIN and a current token code, the one-time passcodes can be understood and used by a user identity verification process without the user identity verification process having to store or process biometric data. A further advantage is that embodiments of the disclosed system introduce support for biometrics to improve the user experience without requiring potentially costly changes to backend infrastructures.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the scope of the invention is broader than the specific examples of embodiments disclosed herein.

Figure 1:
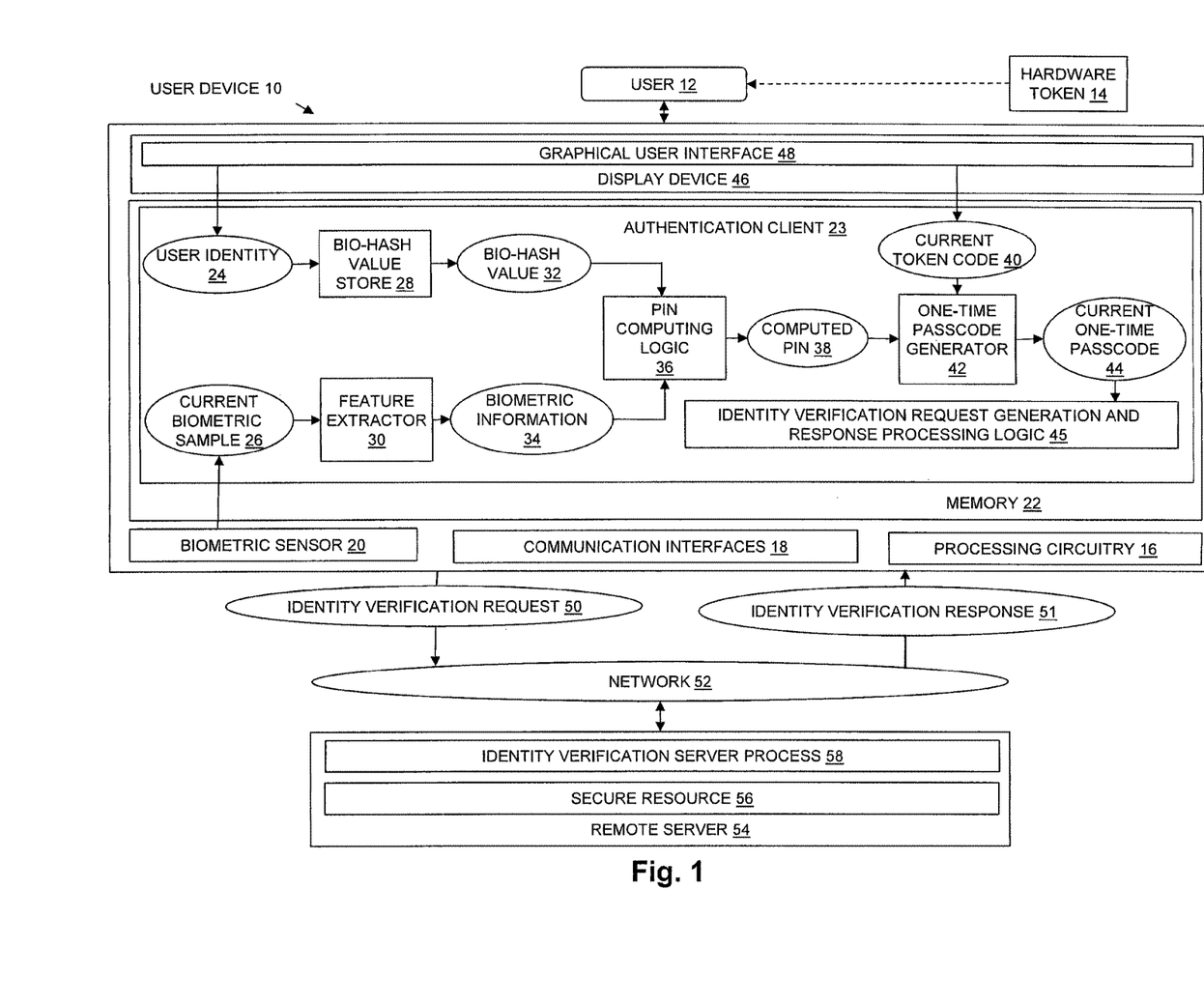
FIG. 1 is a block diagram showing an example of components in an illustrative embodiment operating to perform an authentication operation that includes two factor authentication using a one-time passcode, and that is based on biometric information obtained from a user to compute the user's personal identification number (PIN)

FIG. 1 is a block diagram showing an example of components in an illustrative embodiment operating to perform an authentication operation that includes two factor authentication using a one-time passcode, and that is based on biometric information obtained from a user to compute the user's personal identification number (PIN). The User Device 10 shown in FIG. 1 may consist of or include any specific type of computerized user device, including but not limited to a desktop computer, a mobile device such as a laptop computer, tablet computer, smartphone, and/or personal digital assistant (PDA), and/or any other specific type of user device having electronics, software, one or more sensors, and network connectivity that enables the collection and exchange of data.

In the illustrative example of FIG. 1, User Device 10 includes Processing Circuitry 16, Communication Interfaces 18, a Biometric Sensor 20, Memory 22, and a Display Device 46. Display Device 110 may include or consist of any specific type of output device operable to present information in visual form, such as a computer monitor, or any other type of electronic visual display. The Communication Interfaces 18 may, for example, include one or more network adapters and/or network interface cards for converting electronic and/or optical signals received over a Network 150 into electronic form for use by User Device 10. The Processing Circuitry 16 may, for example, include or consist of one or more microprocessors, e.g. central processing units (CPUs), multi-core processors, chips, and/or assemblies.

The Memory 22 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on Processing Circuitry 16, and for storing data operated on by such program code. Program code executable on User Device 10 is shown including an Authentication Client 23, which may include various specific program components and/or modules, etc. For purposes of explanation with reference to FIG. 1, the components of Authentication Client 23 are shown to include Feature Extractor 30, PIN Computing Logic 36, One-Time Passcode Generator 42 and Identity Verification Request Generation and Response Processing Logic 45.

A Bio-hash Value Store 28 may include or consist of an electronic data store (e.g. database, etc.), that is accessible to and/or maintained by Authentication Client 23, into which one or more bio-hash values may be stored by Authentication Client 23, and from which individual bio-hash values may be retrieved by Authentication Client 23.

Those skilled in the art will recognize that while certain software constructs are specifically shown and described for purposes of explanation, the Memory 22 may additionally or alternatively include other software constructs, which are not shown in FIG. 1, such as an operating system, various applications, and/or other processes.

Biometric Sensor 20 may consist of or include a digital camera or digital video camera operable to capture image or video data (e.g. one or more images of User 12's face, fingerprint, eye or eye region, palm, etc.), a microphone operable to capture a recording of User 12's voice, and/or any other specific type of biometric sensor operable to capture biometric samples.

Figure 2:
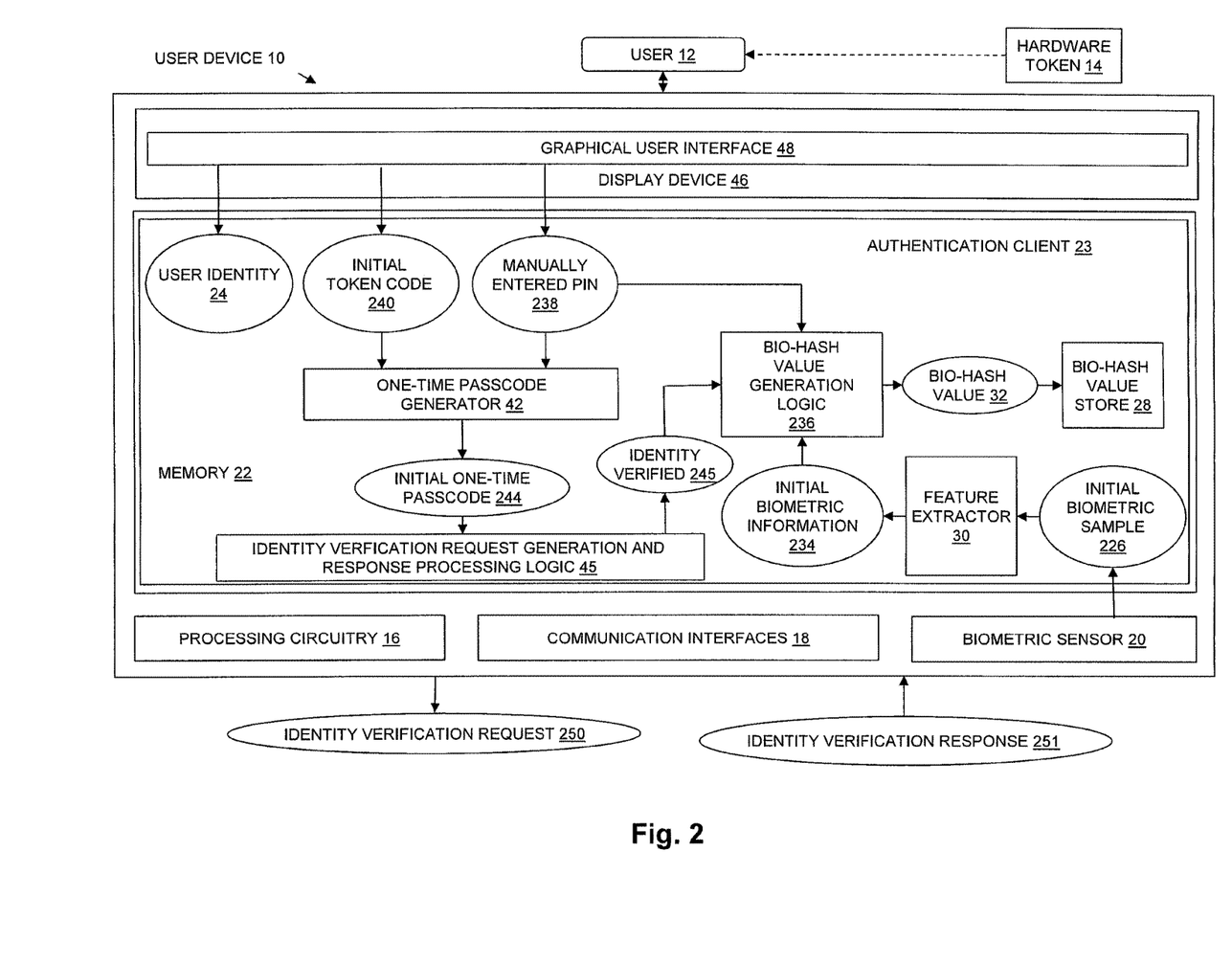
FIG. 2 is a block diagram showing an example of components in an illustrative embodiment operating to perform a PIN replacement operation by generating a bio-hash value for a user, such that the bio-hash value can subsequently be used during authentication operations that perform two factor authentication using a one-time passcode based on biometric information obtained from the user, without requiring the user to enter the user's PIN during the subsequent authentication operations.

Hardware Token 14 may consist of or include any specific type of security token that generates a token code at fixed intervals using a built-in clock and a factory-encoded seed. While a hardware token is shown in the examples of FIG. 1 and FIG. 2, those skilled in the art will recognize that the disclosed system is not limited to operating using token codes that are provided by hardware tokens. Accordingly, the disclosed system may operate using token codes generated by a software token, or by any other appropriate token code generator. Similarly, while the examples provided with reference to FIG. 1 and FIG. 2 describe manual entry of token codes by the user through a graphical user interface (e.g. Graphical User Interface 48) of a user device, the disclosed system may alternatively operate based on token codes that are automatically loaded from the security token into the memory of the user device, e.g. from the security token to the user device memory through a USB (Universal Serial Bus) interface of the user device, from the security token to the user device memory through a wireless connection (e.g. based on Bluetooth wireless technology or the like), or using any other specific technique.

As shown in FIG. 1, during operation of the User Device 10, Authentication Client 23 uses biometric information to perform two-factor authentication using a one-time passcode to authenticate a current user of User Device 10 (e.g. User 12). Specifically, as described below with reference to FIG. 1, Authentication Client 23 may perform an authentication operation to verify that User 12 is an authentic user, i.e. is actually who they claim to be, and are not an imposter.

For example, when User 12 attempts to access a secure resource (e.g. Secure Resource 56 located on or provided by a remote computer such as Remote Server 54) using User Device 10, Authentication Client 23 may be triggered to perform an authentication operation to authenticate User 12, in order to prevent an imposter from accessing the secure resource. Examples of secure resources to which access may be restricted, and that may accordingly require user authentication by Authentication Client 23 include, without limitation, Web sites, online services, application programs, confidential or proprietary data, cloud computing resources, computer systems, and/or any other type of secure resource for which authentication may be required prior to access.

For example, when User 12 attempts to access Secure Resource 56 using User Device 10, Authentication Client 23 may generate a prompt that is displayed in Graphical User Interface 48, and that requests that User 12 enter User 12's user identifier. User 12's user identifier may be a username, electronic mail address, or some other specific type of user identifier that is uniquely associated with User 12. User 12's user identifier may be input by User 12 through Graphical User Interface 48 in response to such a prompt, and is shown in FIG. 1 by User Identity 24.

In addition, also in response to User 12 attempting to access Secure Resource 56 using User Device 10, Authentication Client 23 may generate another prompt that is displayed in Graphical User Interface 48, that requests that User 12 enter a current token code, i.e. a token code that is currently being displayed by a hardware or software based security token that is assigned to User 12. For example, Authentication Client 23 may generate a prompt that requests that User 12 enter a token code that is currently being displayed by Hardware Token 14. The token code entered by User 12 through Graphical User Interface 48 in response to such a prompt is shown in FIG. 1 by Current Token Code 40.

While in the example of FIG. 1 Current Token Code 40 is shown for purposes of illustration as being input through Graphical User Interface 48, e.g. as read from a hardware security token and manually entered by the user, the Current Token Code 40 may alternatively be automatically input (e.g. in response to User 12 attempting to access Secure Resource 56 using User Device 10) from a software based security token that also executes on User Device 10. In the case where Current Token Code 40 is automatically input from a software based security token, there is no need for the user to manually enter the Current Token Code 40.

Authentication Client 23 uses User Identity 24 to access (e.g. using an index or the like derived from User Identity 24) Bio-Hash Value Store 28, in order to retrieve a bio-hash value associated with User Identity 24. For example, Authentication Client 23 uses User Identity 24 to obtain Bio-Hash Value 32 from Bio-Hash Value Store 28.

Further in response to User 12 attempting to access the secure resource (e.g. Secure Resource 56), Biometric Sensor 20 may capture at least one biometric sample from User 12, shown in FIG. 1 by Current Biometric Sample 26. Current Biometric Sample 26 may, for example, include biometric data captured by a biometric sensor made up of an image or video acquisition system that includes or consists of a digital camera and/or a digital video camera. Such biometric data may include one or more images of User 12's face, eye or eye region, palm print or fingerprint. Current Biometric Sample 26 may alternatively include biometric data captured by a biometric sensor made up of a sound acquisition system that includes or consists of one or more microphones. Such biometric data may include a digital recording of the User 12's voice, or any other specific type of biometric data.

Current Biometric Sample 26 is passed to Feature Extractor 30, which performs feature extraction on Current Biometric Sample 26. During feature extraction, Biometric Information 34 is extracted from Current Biometric Sample 26. The Biometric Information 34 that is extracted from Current Biometric Sample 26 uniquely identifies the user from whom Current Biometric Sample 26 was captured (e.g. User 12), and includes a digital representation of at least one distinct physiological or behavioral biometric characteristic of that user. Distinct physiological biometric characteristics represented by Biometric Information 34 may include various distinct characteristics that are unique to the user's body. Examples include, but are not limited to, distinct characteristics of the user's fingerprint, palm print, face, eye or eye region. Examples of distinct behavioral biometric characteristics that may be represented by Biometric Information 34 include various distinct characteristics related to the user's behavior. Examples include but are not limited to distinct characteristics of the user's voice, typing rhythm, and/or gait. Such distinct behavioral characteristics may be extracted by Feature Extractor 30 from Current Biometric Sample 26, in the case where Current Biometric Sample 26 consists of one or more digital recordings of the user's voice, typing rhythm, and/or movement, and that are captured from the user by way of an appropriate type of biometric sensor (e.g. Biometric Sensor 20), such as a sound acquisition system including one or more microphones, and/or a video acquisition system including a digital video camera or the like.

In one embodiment, Feature Extractor 30 extracts Biometric Information 34 from Current Biometric Sample 26 such that Biometric Information 34 is a subset of biometric data contained in Current Biometric Sample 26, and such that Biometric Information 34 has a bit length equal to a bit length of the Bio-hash Value 32 (i.e. such that Biometric Information 34 and Bio-hash Value 32 have the same length in terms of bits).

Bio-hash Value 32 and Biometric Information 34 are passed to PIN Computing Logic 36. PIN Computing Logic 36 automatically generates Computed PIN 38 using Biometric Information 34 and Bio-Hash Value 32. PIN Computing Logic 36 generates Computed PIN 38 such that Computed PIN 38 matches the authentic user's PIN when the Biometric Information 34 matches initial biometric information that was combined with the authentic user's PIN to generate Bio-Hash Value 32 during a previous PIN replacement operation. For example, in one embodiment, PIN Computing Logic 36 generates Computed PIN 38 by performing a bitwise exclusive-OR (XOR) operation between Biometric Information 34 and Bio-Hash Value 32. The result of performing the bitwise exclusive-OR (XOR) operation on Biometric Information 34 and Bio-Hash Value 32 is output from PIN Computing Logic 36, and shown in FIG. 1 as Computed PIN 38.

Computed PIN 38 is passed to One-Time Code Generator 42, which also receives as input Current Token Code 40. One-Time Code Generator 42 combines Computed PIN 38 and Current Token Code 40 to generate Current One-Time Passcode 44. For example, One-Time Code Generator 42 may combine Computed PIN 38 and Current Token Code 40 by concatenating Computed PIN 38 and Current Token Code 40 together to generate Current One-Time Passcode 44.

Current One-time Passcode 44 is passed to Identity Verification Request Generation and Response Processing Logic 45. Identity Verification Request Generation and Response Process Logic 45 outputs Current One-Time Passcode 44. For example, Identity Verification Request Generation and Response Processing Logic 45 may send Current One-time Passcode 44 to a user identity verification process, shown for purposes of illustration in FIG. 1 by Identity Verification Server Process 58. Identity Verification Server Process 58 may, for example, consist of or include one or more software processes executing on a remote server computer, such as Remote Server 54. In the example of FIG. 1, Identity Verification Request Generation and Response Processing Logic 45 sends Current One-Time Passcode 44 to Identity Verification Server Process 58 to Remote Server 54 in an Identity Verification Request 50. Identity Verification Request 50 may further include a copy of User Identity 24.

Identity Verification Request 50 requests an indication from Identity Verification Server Process 58 of whether the Computed PIN 38 and the Current Token Code 40 contained in Current One-Time Passcode 44 are valid for User Identity 24. For example, upon receipt of Identity Verification Request 50 by Remote Server 54, Identity Verification Server Process 58 may compare Computed PIN 38 to a copy of the correct PIN of the authentic user for User Identity 24, and that is stored on Remote Server 54. Identity Verification Server Process 58 may also generate the token code that is supposed to be displayed at the current point in time on the security token assigned to the authentic user for User Identity 24, using a copy of the unique seed assigned to that security token and stored on Remote Server 54, and compare the generated token code to the Current Token Code 40. In the case where Computed PIN 38 matches the copy of the correct PIN of the authentic user for User Identity 24, and Current Token Code 40 matches the token code generated by Identity Verification Server Process 58 based on the copy of the unique seed, then Identity Verification Server Process 58 determines that Computed PIN 38 and Current Token Code 40 are valid for User Identity 24. As a result, Identity Verification Server Process 58 stores an indication in Identity Verification Response 51 that Computed PIN 38 and Current Token Code 40 are valid for User Identity 24. Identity Verification Response 51 is then transmitted from Remote Server 54 to the User Device 10.

In the case where either Computed PIN 38 does not match the correct PIN of the authentic user for User Identity 24, or Current Token Code 40 does not match the token code generated by Identity Verification Server Process 58 based on the copy of the unique seed, then Identity Verification Server Process 58 determines that Computed PIN 38 and Current Token Code 40 are not valid for User Identity 24. As a result, Identity Verification Server Process 58 stores an indication in Identity Verification Response 51 that Computed PIN 38 and Current Token Code 40 are not valid for User Identity 24. Identity Verification Response 51 is then transmitted from Remote Server 54 to the User Device 10.

While in the above example the Current One-Time Passcode 44 is output by being automatically sent with User Identity 24 to Identity Verification Server Process 58 in Identity Verification Request 50, the Current One-Time Passcode 44 may alternatively be output by being displayed to the user through Graphical User Interface 48. In such a case, the user would then read Current One-Time Passcode 44, and then manually enter Current One-Time Passcode 44 and User Identity 24 into a user interface of Identity Verification Server Process 58, for validation by Identity Verification Server Process 58 as described above.

Upon receipt of Identity Verification Response 51 by User Device 10, Identity Verification Request Generation and Response Processing Logic 45 may verify that the current user of User Device 10 (e.g. User 12) is authentic, i.e. is the authentic user for User Identity 24, in response to an indication contained in Identity Verification Response 51 that Computed PIN 38 and Current Token Code 40 are valid for User Identity 24. In response to verifying that the current user of User Device 10 is authentic, Identity Verification Request Generation and Response Processing Logic 45 may grant access to the secure resource (e.g. Secure Resource 56) from User Device 10.

Identity Verification Request Generation and Response Processing Logic 45 may determine that the current user of User Device 10 (e.g. User 12) is not authentic, i.e. is not the authentic user for User Identity 24, in response to an indication contained in Identity Verification Response 51 that Computed PIN 38 and Current Token Code 40 are not valid for User Identity 24. In response to determining that the current user of User Device 10 is not authentic, Identity Verification Request Generation and Response Processing Logic 45 denies access to the secure resource (e.g. Secure Resource 56) from User Device 10.

FIG. 2 is a block diagram showing an example of components in an illustrative embodiment operating to perform a PIN replacement operation by generating a bio-hash value for a user, such that the bio-hash value can subsequently be used during authentication operations that perform two factor authentication using a one-time passcode based on biometric information obtained from the user, without requiring the user to enter the user's PIN during the subsequent authentication operations. In the example of FIG. 2, for purposes of explanation, the components of Authentication Client 23 are shown to further include Bio-Hash Value Generation Logic 236.

As shown in FIG. 2, during operation of the User Device 10, Authentication Client 23 may perform a PIN replacement operation, prior to performing the authentication operation described above with reference to FIG. 1. The PIN replacement operation illustrated in FIG. 2 is performed so that the authentic user for User Identity 24 (e.g. User 12) does not need to remember and/or enter their PIN for subsequent authentication operations on User Device 10. During the PIN replacement operation illustrated in FIG. 2, Authentication Client 23 may input (e.g. through Graphical User Interface 48) User Identity 24, an Initial Token Code 240, and a Manually Entered PIN 238. Initial Token Code 240 is a token code that is currently being displayed by the hardware or software based security token (e.g. Hardware Token 14) that is assigned to the authentic user for User Identity 24 (e.g. User 12), at the time of the PIN replacement operation. While in the example of FIG. 2 Initial Token Code 240 is shown for purposes of illustration as being input through Graphical User Interface 48, e.g. as manually entered by the user, the Initial Token Code 240 may alternatively be automatically input from a software based security token that also executes on User Device 10. In the case where Initial Token Code 240 is automatically input from a software based security token, there is no need for the user to manually enter the Initial Token Code 240.

The Manually Entered PIN 238 is the correct PIN associated with the authentic user for User Identity 24 (e.g. User 12), and that has been manually entered by the authentic user for User Identity 24 (e.g. User 12) through Graphical User Interface 48.

One-Time Code Generator 42 combines Manually Entered PIN 238 and Initial Token Code 240 to generate Initial One-Time Passcode 244. For example, One-Time Passcode Generator 42 may combine Manually Entered PIN 238 and Initial Token Code 240 by concatenating Manually Entered PIN 238 and Current Token Code 40 together to generate Initial One-Time Passcode 244.

Initial One-Time Passcode 244 is then output. For example, Identity Verification Request Generation and Response Processing Logic 45 may automatically send Initial One-Time Passcode 244 and User Identity 24 within or as part of Identity Verification Request 250 to Identity Verification Server Process 58 (FIG. 1), in order to authenticate User 12 (i.e. to verify that User 12 is the authentic user for User Identity 24, and not an imposter). Upon receipt of Identity Verification Request 250 by Remote Server 54, Identity Verification Server Process 58 compares Manually Entered PIN 238 to a copy of the correct PIN of the authentic user for User Identity 24 that is stored on Remote Server 54. Identity Verification Server Process 58 may also generate the token code that is supposed to be displayed on the security token assigned to the authentic user for User Identity 24 at the point in time at which the PIN replacement operation is performed, using the copy of the unique seed assigned to that security token and stored on Remote Server 54, and compare the generated token code to the Initial Token Code 240. In the case where Manually Entered PIN 238 matches the correct PIN of the authentic user for User Identity 24, and Initial Token Code 240 matches the generated token code, then Identity Verification Server Process 58 determines that Manually Entered PIN 238 and Initial Token Code 240 are valid for User Identity 24. As a result, Identity Verification Server Process 58 includes an indication in Identity Verification Response 251 that Manually Entered PIN 238 and Initial Token Code 240 are valid for User Identity 24. Identity Verification Response 51 is then transmitted from Remote Server 54 to the User Device 10.

While in the above example the Initial One-Time Passcode 244 is output by being automatically sent with User Identity 24 to Identity Verification Server Process 58 in Identity Verification Request 250, the Initial One-Time Passcode 244 may alternatively be output by being displayed to the user through Graphical User Interface 48. In such a case, the user would then read Initial One-Time Passcode 244, and then manually enter Initial One-Time Passcode 244 and User Identity 24 into a user interface of Identity Verification Server Process 58, for validation by Identity Verification Server Process 58 as described above.

Upon receipt of Identity Verification Response 251 by User Device 10, Identity Verification Request Generation and Response Processing Logic 45 verifies that the current user of User Device 10 (e.g. User 12) is authentic, i.e. is the authentic user for User Identity 24 and not an imposter, in response to the indication contained in Identity Verification Response 251 that Manually Entered PIN 238 and Initial Token Code 240 are valid for User Identity 24. In response to verifying that the current user of User Device 10 is authentic, Identity Verification Request Generation and Response Processing Logic 45 generates a message or other indication that the current user of User Device 10 is authentic (e.g. Identity Verified message 245), which is passed to Bio-Hash Value Generation Logic 236.

In response to the Identity Verified message 245, Bio-Hash Value Generation Logic 236 automatically generates the bio-hash value for User Identity 23, i.e. Bio-Hash Value 32. Bio-Hash Value 32 is a combination of Initial Biometric Information 234, which uniquely identifies the authentic user for User Identity 24, and the Manually Entered PIN 238, which is the correct PIN of the authentic user for User Identity 24.

As shown in FIG. 2, Bio-Hash Value Generation Logic 236 generates Bio-Hash Value 32 using Initial Biometric Information 234, after Initial Biometric Information 234 is generated by Feature Extractor 30 from Initial Biometric Sample 236. Biometric Sensor 20 may capture Initial Biometric Sample 226 during the PIN replacement operation, for example in response to verifying that User 12 is the authentic user for User Identity 24 (e.g. in response to Identity Verified message 245). Initial Biometric Sample 226 is made up of the same type of biometric data as is contained in the Current Biometric Sample 26 that is subsequently captured during a user authentication operation, as described above with reference to FIG. 1. Similarly, the feature extraction performed by Feature Extractor 30 on Initial Biometric Sample 226 is the same as the feature extraction performed by Feature Extractor 30 on Current Biometric Sample 26 during a subsequent authentication operation. Accordingly, the Initial Biometric Information 234 extracted from Initial Biometric Sample 226 identifies the authentic user for User Identity 24 (e.g. User 12), and includes a digital representation of the same distinct physiological or behavioral biometric characteristic of the authentic user for User Identity 24 as is included in the Biometric Information 34 that results from performing feature extraction on Current Biometric Sample 26 during the authentication operation described above with reference to FIG. 1.

In one embodiment, Feature Extractor 30 extracts Initial Biometric Information 234 from Initial Biometric Sample 226 such that Initial Biometric Information 234 is a subset of biometric data contained in Initial Biometric Sample 226, and such that Initial Biometric Information 234 has a bit length equal to a bit length of the Manually Entered PIN 238 (i.e. such that Initial Biometric Information 234 and Manually Entered PIN 238 have the same length in terms of bits). Bio-Hash Value Generation Logic 236 may automatically generate Bio-Hash Value 32 using Initial Biometric Information 234 and Manually Entered PIN 238 by performing a bit-wise exclusive-OR (XOR) operation between Initial Biometric Information 234 and Manually Entered PIN 238. The result of performing the bitwise exclusive-OR (XOR) operation on Initial Biometric Information 234 and Manually Entered PIN 238 during the PIN replacement operation is output from Bio-Hash Value Generation Logic 236, and shown in FIG. 2 as Bio-Hash Value 32. Bio-Hash Value Generation Logic 236 also stores Bio-Hash Value 32 on the User Device 10, for example in Bio-Hash Value Store 28, in association with User Identity 24, such that the Bio-Hash Value 32 can subsequently be retrieved during an authentication operation based on User Identity 24.

Figure 3:
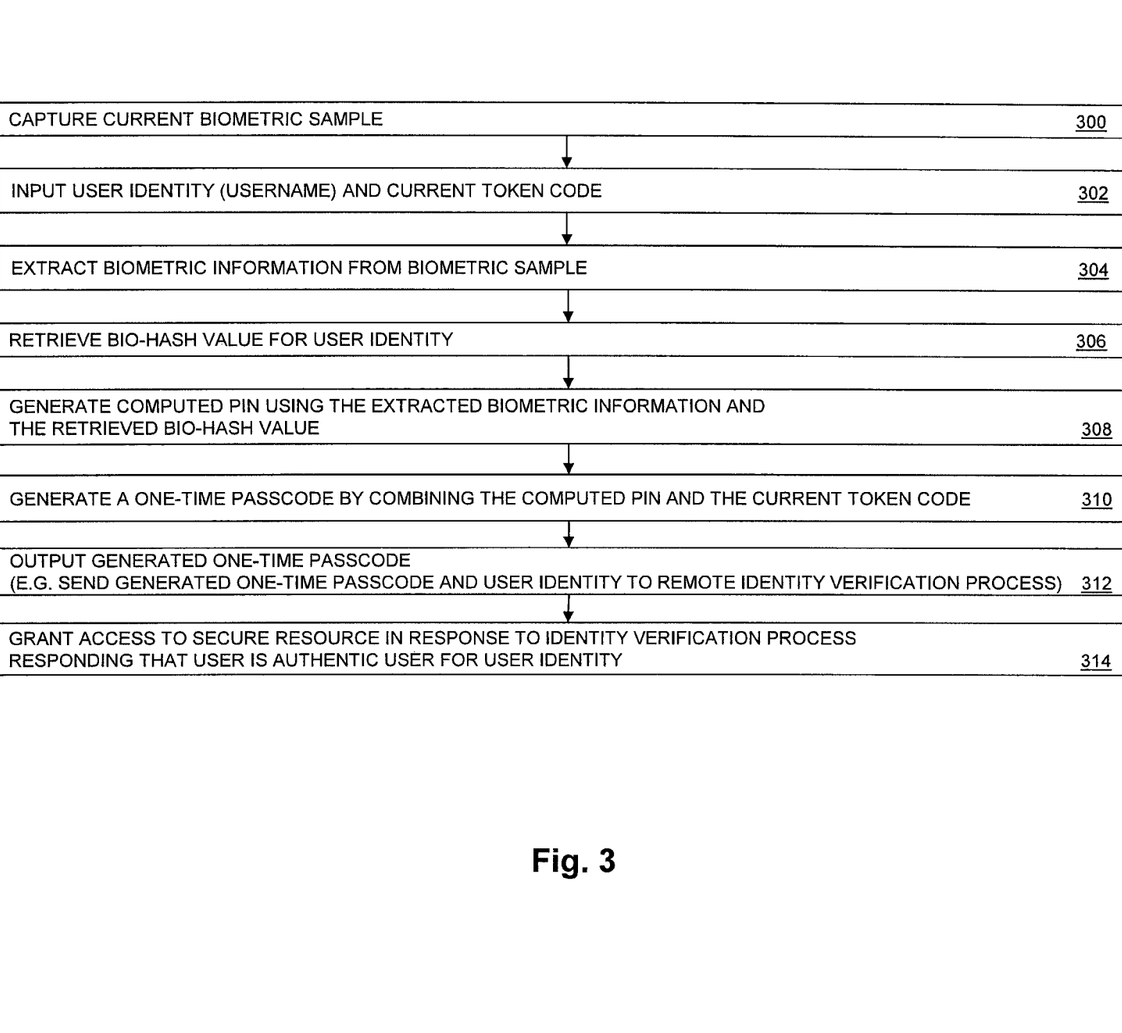
FIG. 3 is a flow chart showing steps performed by an embodiment of the disclosed system to perform an authentication operation that includes two factor authentication using a one-time passcode, and that is based on biometric information obtained from a user to compute the user's PIN.

FIG. 3 is a flow chart showing steps performed by an embodiment of the disclosed system to perform an authentication operation that includes two factor authentication using a one-time passcode, and that is based on biometric information obtained from a user, in which the biometric information obtained from the user is used to compute the user's PIN. The steps shown in FIG. 3 may, for example, be performed by the Authentication Client 23 shown in FIG. 1 and FIG. 2. The steps shown in FIG. 3 may be performed in response to a current user of a user device attempting to access a secure resource, in order to authenticate the current user of the user device prior to allowing the user device to access the secure resource. At step 300, the user device captures a current biometric sample from a current user of a user device. At step 302, the user device inputs a user identity (e.g. a username, electronic mail address, etc.), and a current token code (e.g. a token code currently displayed on a hardware security token assigned to the current user of the user device), for example through a graphical user interface of the user device. While the current token code may be input through a graphical user interface by way of manual entry by the user (e.g. at step 302), e.g. as read by the user from a hardware security token and then manually entered by the user, the current token code may alternatively be automatically input (e.g. at step 302 or at step 310) from a software based security token or the like. In the case where the current token code is automatically input from a software based security token, there is no need for the user to manually enter the current token code.

At step 304, biometric information is extracted from the biometric sample captured at step 300, and at step 306 a bio-hash value associated with the user identity is automatically retrieved. At step 308 a computed PIN is generated using the biometric information extracted at step 304 and the bio-hash value retrieved at step 306. The computed PIN is then combined with the current token code to generate a one-time passcode at step 310. The generated one-time passcode is then output, e.g. by being automatically sent with the user identity to an identity verification process, e.g. executing on a remote server computer. The generated one-time passcode may alternatively be output by being displayed to the user through a user interface, so that the user can read the generated one-time passcode and then manually enter the generated one-time passcode into a user interface of the identity verification process. In response to the identity verification process sending back an indication that the current user of the user device is authentic (i.e. that the computed PIN and current token code are valid for the user identity), the user device is allowed to access the secure resource.

Figure 4:
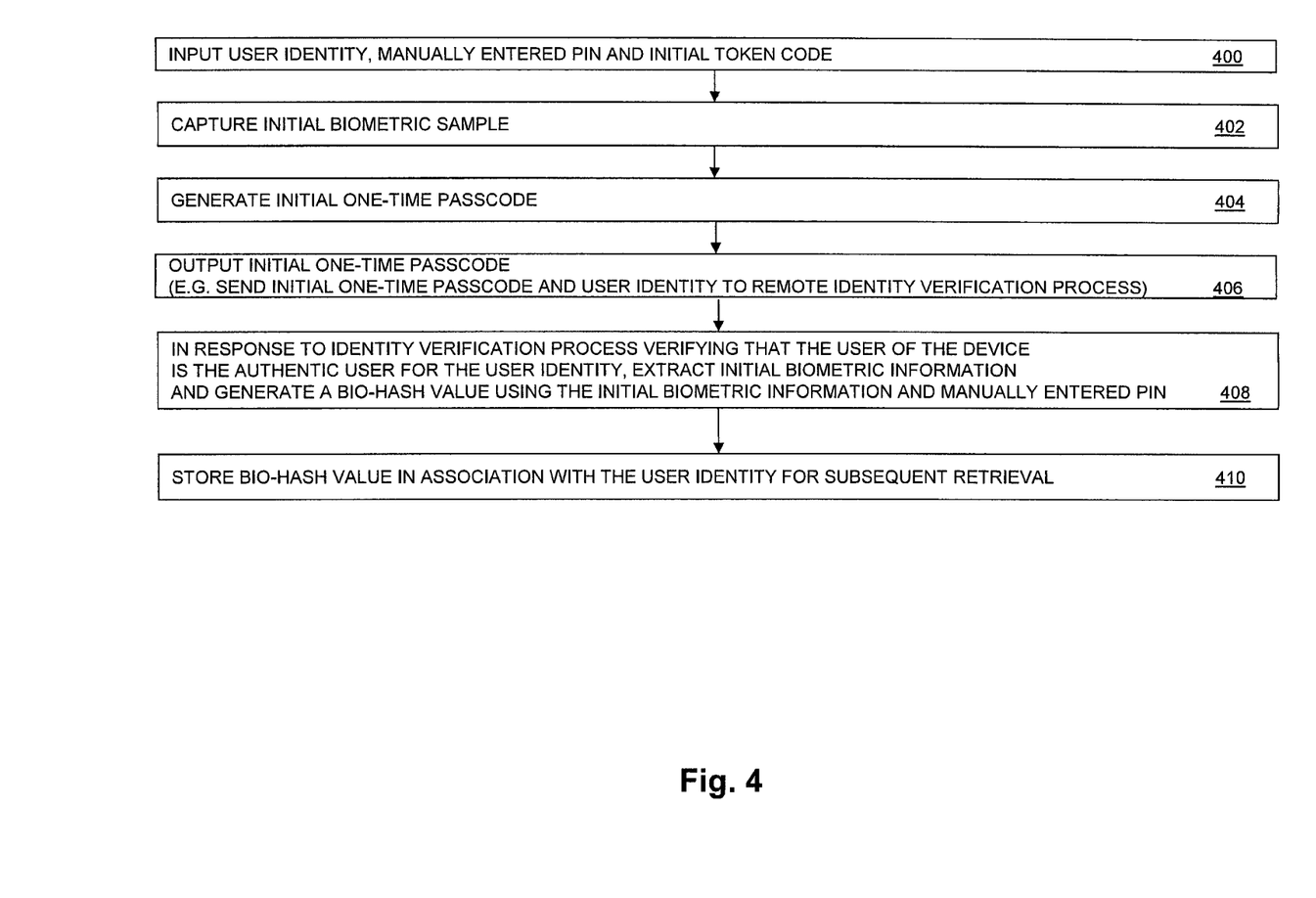
FIG. 4 is a flow chart showing steps performed by an embodiment of the disclosed system to perform a PIN replacement operation by generating a bio-hash value for a user such that the bio-hash value can subsequently be used during authentication operations to perform two factor authentication using a one-time passcode based on biometric information obtained from the user, without requiring the user to enter the user's PIN.

FIG. 4 is a flow chart showing steps performed by an embodiment of the disclosed system to perform a PIN replacement operation by generating a bio-hash value for an authentic user, such that the bio-hash value can subsequently be used during authentication operations to perform two factor authentication using a one-time passcode based on biometric information obtained from the user, without requiring the user to enter their PIN. The steps shown in FIG. 4 may, for example, be performed by the Authentication Client 23 shown in FIG. 1 and FIG. 2.

At step 400, the user device inputs a user identity, a manually entered PIN, and an initial token code, for example through a graphical user interface of the user device. While the initial token code may be input through a graphical user interface by way of manual entry by the user (e.g. at step 400), e.g. as read by the user from a hardware security token and then manually entered by the user, the initial token code may alternatively be automatically input (e.g. at step 400 or 402) from a software based security token. In the case where the initial token code is automatically input from a software based security token, there is no need for the user to manually enter the initial token code.

At step 402, the disclosed system captures an initial biometric sample from the user of the user device. At step 404, the disclosed system generates an initial one-time passcode by combining the initial token code and the manually entered PIN. At step 406 the initial one-time passcode is output, e.g. by being automatically sent with the user identity to an identity verification process to validate the initial token code and the manually entered PIN. Alternatively, the initial one-time passcode may be output by being displayed to the user through a graphical user interface, so that the user can read the initial-one-time passcode and manually enter the initial one-time passcode and user identity into a user interface of the identity verification process. At step 408, in response to the identity verification process providing an indication that the initial token code and manually entered PIN are valid for the user identity, the initial biometric information is extracted from the initial biometric sample captured at step 402, and a bio-hash value for the user identity is generated based on the initial biometric information and the manually entered PIN. The bio-hash value generated at step 408 is a combination of the initial biometric information extracted at step 408 and the manually entered PIN input at step 400. At step 410 the bio-hash value is stored in association with the user identity, so that the bio-hash value can subsequently be retrieved for use during subsequent authentication operations.

After completion of the PIN replacement operation illustrated by the steps shown in FIG. 4, the user can provide a biometric sample to gain access to a secure resource that requires two-factor authentication, instead of having to enter their PIN. The user is accordingly not required to remember or enter their PIN after completion of the PIN replacement operation illustrated by the steps of FIG. 4. After the PIN replacement operation shown in FIG. 4, subsequent authentication operations for the user may be performed that generate one-time passcodes that include a computed copy of the user's PIN and a current token code, with the one-time passcodes being understood and used by an external (e.g. remote) user identity verification process, without the user identity verification process having to store or process any of the user's biometric data.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of using biometric information to perform two-factor authentication using a one-time passcode to authenticate a current user of a user device, comprising:
    performing an authentication operation to authenticate the current user of the user device, by
        inputting a user identity and a current token code,
        retrieving a bio-hash value associated with the user identity,
        automatically generating a computed personal identification number (PIN) using biometric information captured during the authentication operation and the retrieved bio-hash value,
        generating a current one-time passcode by combining the computed PIN and the current token code, and
        outputting the current one-time passcode generated from the computed PIN and the current token code.

2. The method of claim 1, wherein outputting the current one-time passcode generated from the computed PIN and the current token code comprises displaying the current one-time passcode generated from the computed PIN and the current token code on a display device of the user device.

3. The method of claim 1, wherein outputting the current one-time passcode generated from the computed PIN and the current token code comprises sending the one-time passcode generated from the computed PIN and the current token code to a user identity verification process to obtain an indication from the identity verification process of whether the computed PIN and the current token code are valid for the user identity, wherein the authentication operation determines that the current user of the user device is authentic in response to an indication from the user identity verification process that the computed PIN and the current token code are valid for the user identity.

4. The method of claim 3, wherein performing the authentication operation further comprises:
    capturing a current biometric sample through a biometric sensor of the user device; and
    extracting the biometric information from the current biometric sample, wherein the biometric information is a subset of biometric data contained in the current biometric sample, and wherein the extracted biometric information has a bit length equal to a bit length of the computed PIN.

5. The method of claim 4, wherein automatically generating the computed personal identification number (PIN) using the biometric information and the retrieved bio-hash value comprises performing a bit-wise exclusive-OR (XOR) operation between the biometric information and the retrieved bio-hash value.

6. The method of claim 4, wherein performing the authentication operation is in response to an attempt to access a secure resource through the user device, and wherein performing the authentication operation further comprises:
    granting access to the secure resource from the user device in response to receipt of an indication from the user identity process that the computed PIN and the current token code are valid for the user identity.

7. The method of claim 1, further comprising performing a PIN replacement operation, prior to performing the authentication operation, by:
    inputting the user identity, a manually entered PIN, and an initial token code
    generating an initial one-time passcode by combining the manually entered PIN and the initial token code;
    sending the initial one-time passcode and the user identity to the user identity verification process;
    receiving, from the user identity verification process, an indication that the manually entered PIN and initial token code are valid for the user identity;
    in response to receiving the indication that the manually entered PIN and the initial token code are valid for the user identity, automatically generating the bio-hash value for the user identity using biometric information captured during the PIN replacement operation and the manually entered PIN; and storing the bio-hash value on the user device, in association with the user identity, such that the bio-hash value can subsequently be retrieved for use with the user identity when performing the subsequent authentication operation.

8. The method of claim 7, wherein performing the PIN replacement operation further comprises:

capturing an initial biometric sample through the biometric sensor of the user device; and extracting the biometric information from the initial biometric sample, wherein the biometric information is a subset of biometric data contained in the initial biometric sample, and wherein extracting the biometric information results in a set of biometric information having a bit length equal to a bit length of the manually entered PIN.

9. The method of claim 8, wherein automatically generating the bio-hash value for the user identity using the biometric information and the manually entered PIN comprises performing a bit-wise exclusive-OR (XOR) operation between the biometric information and the manually entered PIN.

10. A device, comprising:

memory; and processing circuitry coupled to the memory, the memory storing program code for using biometric information to perform two-factor authentication using a one-time passcode to authenticate a current user of the device which, when executed by the processing circuitry, causes the processing circuitry to:

perform an authentication operation to authenticate the current user of the device, by inputting a user identity and a current token code, retrieving a bio-hash value associated with the user identity, automatically generating a computed personal identification number (PIN) using biometric information captured during the authentication operation and the retrieved bio-hash value, generating a current one-time passcode by combining the computed PIN and the current token code, and outputting the current one-time passcode generated from the computed PIN and the current token code.

11. The device of claim 10, wherein the program code, when executed, causes the processing circuitry to perform the authentication operation by outputting the current one-time passcode generated from the computed PIN and the current token code by displaying the current one-time passcode generated from the computed PIN and the current token code on a display device of the device.

12. The device of claim 10, wherein the program code, when executed, causes the processing the circuitry to perform the authentication operation by outputting the current one-time passcode generated from the computed PIN and the current token code by sending the one-time passcode generated from the computed PIN and the current token code to a user identity verification process to obtain an indication from the identity verification process of whether the computed PIN and the current token code are valid for the user identity, wherein the authentication operation determines that the current user of the device is authentic in response to an indication from the user identity verification process that the computed PIN and the current token code are valid for the user identity.

13. The device of claim 12, wherein the program code, when executed, causes the processing circuitry to perform the authentication operation by further:

capturing a current biometric sample through a biometric sensor of the device; and extracting the biometric information from the current biometric sample, wherein the biometric information is a subset of biometric data contained in the current biometric sample, and wherein the extracted biometric information has a bit length equal to a bit length of the computed PIN.

14. The device of claim 13, wherein the program code, when executed, causes the processing circuitry to automatically generate the computed personal identification number (PIN) using the biometric information and the retrieved bio-hash value by performing a bit-wise exclusive-OR (XOR) operation between the biometric information and the retrieved bio-hash value.

15. The device of claim 13, wherein the program code, when executed, causes the processing circuitry to perform the authentication operation in response to an attempt to access a secure resource through the device, and to perform the authentication operation by further:

granting access to the secure resource from the device in response to receipt of an indication from the user identity process that the computed PIN and the current token code are valid for the user identity.

16. The device of claim 10, wherein the program code, when executed, further causes the processing circuitry to perform a PIN replacement operation, prior to performing the authentication operation, by:

inputting the user identity, a manually entered PIN, and an initial token code generating an initial one-time passcode by combining the manually entered PIN and the initial token code;

sending the initial one-time passcode and the user identity to the user identity verification process;

receiving, from the user identity verification process, an indication that the manually entered PIN and initial token code are valid for the user identity;

in response to receiving the indication that the manually entered PIN and the initial token code are valid for the user identity, automatically generating the bio-hash value for the user identity using biometric information captured during the PIN replacement operation and the manually entered PIN; and storing the bio-hash value on the device, in association with the user identity, such that the bio-hash value can subsequently be retrieved for use with the user identity when performing the subsequent authentication operation.

17. The device of claim 16, wherein the program code, when executed, causes the processing circuitry to perform the PIN replacement operation by further:

capturing an initial biometric sample through the biometric sensor of the device; and extracting the biometric information from the initial biometric sample, wherein the biometric information is a subset of biometric data contained in the initial biometric sample, and wherein extracting the biometric information results in a set of biometric information having a bit length equal to a bit length of the manually entered PIN.

18. The device of claim 17, wherein the program code, when executed, causes the processing circuitry to perform the PIN replacement operation by automatically generating the bio-hash value for the user identity using the biometric information and the manually entered PIN by performing a bit-wise exclusive-OR (XOR) operation between the biometric information and the manually entered PIN.

19. A computer program product having a non-transitory computer readable medium which stores a set of instructions operable to use biometric information to perform two-factor authentication using a one-time passcode to authenticate a current user of a user device, the set of instructions, when executed by processing circuitry, causing the processing circuitry to:

perform an authentication operation to authenticate the current user of the user device, by
inputting a user identity and a current token code,
retrieving a bio-hash value associated with the user identity,
automatically generating a computed personal identification number (PIN) using biometric information captured during the authentication operation and the retrieved bio-hash value,
generating a current one-time passcode by combining the computed PIN and the current token code, and
outputting the current one-time passcode generated from the computed PIN and the current token code.

* * * * *